(12) United States Patent
Menshikov

(10) Patent No.: US 8,675,072 B2
(45) Date of Patent: Mar. 18, 2014

(54) MULTI-VIEW VIDEO CAMERA SYSTEM FOR WINDSURFING

(76) Inventor: Sergey G Menshikov, Foster City, CA (US)

( * ) Notice: Subject to any disclaimer, the term of this patent is extended or adjusted under 35 U.S.C. 154(b) by 624 days.

(21) Appl. No.: 12/877,077

(22) Filed: Sep. 7, 2010

(65) Prior Publication Data

US 2012/0057025 A1 Mar. 8, 2012

(51) Int. Cl.
*H04N 7/18* (2006.01)

(52) U.S. Cl.
USPC ........... 348/157; 348/139; 348/143; 348/148; 348/159

(58) Field of Classification Search
USPC .......................................................... 348/157
See application file for complete search history.

(56) References Cited

U.S. PATENT DOCUMENTS

| | | | |
|---|---|---|---|
| 2,931,267 A | 4/1960 | Hoch | |
| 4,311,107 A * | 1/1982 | Imre | 114/39.15 |
| 4,473,022 A * | 9/1984 | Eastland | 114/39.12 |
| 5,211,123 A * | 5/1993 | Greenwood | 114/39.15 |
| 5,473,364 A * | 12/1995 | Burt | 348/47 |
| 6,700,711 B2 | 3/2004 | Nalwa | |
| 7,082,209 B2 * | 7/2006 | Ito et al. | 382/103 |
| 7,090,236 B2 * | 8/2006 | Beckett | 280/213 |
| 7,652,686 B2 * | 1/2010 | Stiller | 348/148 |
| 8,014,656 B2 * | 9/2011 | Woodman | 396/25 |
| 2002/0089765 A1 * | 7/2002 | Nalwa | 359/725 |
| 2006/0170772 A1 * | 8/2006 | McEwan | 348/152 |
| 2008/0278584 A1 * | 11/2008 | Shih et al. | 348/169 |
| 2009/0161911 A1 * | 6/2009 | Shih et al. | 382/103 |
| 2010/0061711 A1 * | 3/2010 | Woodman | 396/428 |
| 2011/0001819 A1 * | 1/2011 | Asari | 348/113 |
| 2011/0267242 A1 * | 11/2011 | Carroll | 343/709 |

OTHER PUBLICATIONS

Giampaolo Cammarotta, GoPro Camera Mounts, Maui Surf Report, Jun. 25, 2007 http://mauisurfreport.blogspot.com/2007/06/gopro-camera-mounts.html.
Sergey Menshikov, Mast Mount for Gopro Digital Hero Video Camera, videojibe.com, Jul. 28, 2008 http://videojibe.com/featured/mast-mount-for-gopro-digital-hero-video-camera/.
Kevin Kan, Pictures and Video from a Windy Day at Coyote, Oct. 30, 2009 http://sunsetsailboards.com/blog/41-windsurf-sessions/110-pictures-and-video-from-a-windy-day-at-coyote.
Dave White, Complete, DaveWhite.me, Aug. 8, 2010 http://www.davewhite.me/news/2010/32-complete/complete.html.

* cited by examiner

*Primary Examiner* — Dave Czekaj
*Assistant Examiner* — Kehinde O Abimbola

(57) ABSTRACT

A multi-view video camera system (25) for filming a windsurfing sailor during sailing, comprising of two video cameras in waterproof compartments (7) with lenses (8) and screw caps (29) attached to a clamp (10) with tightening screw (9) and wing nut (23) for attachment to the mast (11) of a windsurfing sail rig (22). The compartments (7) are oriented to aim the contained video cameras (24) along each side of the windsurfing sail rig (22) at corresponding locations a windsurfing sailor would occupy while sailing the windsurfing sail rig. Video streams, resulting from the contained video cameras could then be combined into single composite video for analysis.

7 Claims, 5 Drawing Sheets

MULTI-VIEW VIDEO CAMERA SYSTEM FOR WINDSURFING

CROSS REFERENCE TO RELATED APPLICATIONS

Nonapplicable

FEDERALLY SPONSORED RESEARCH

Nonapplicable

SEQUENCE LISTING OR PROGRAM

Nonapplicable

BACKGROUND

This application relates to video cameras, particularly ones used to film windsurfing

1. Prior Art

Nonpatent Literature Document

Giampaolo Cammarotta *Maui Surf Report* "gopro camera mounts", http://mauisurfreport.blogspot.com/2007/06/gopro-camera-mounts.html (June 2007)

Windsurfing is a skill-intensive sport, and it's the need to learn that makes it very attractive. The horizons of the skill are boundless and so are the rewards for those who try and learn them. Most windsurfing sailors are trying to improve, obtaining the knowledge from fellow sailors, specialized clinics, camps, videos and publications.

One of the most effective aids to study windsurfing is for sailors to analyze videos of themselves filmed during an attempt to learn a transition or a new trick. The video could be compared with the sailor's mind picture and training videos, as well as shown to an instructor.

It is not always practical for sailors to have other people film them, as what could be an entertaining couple of hours for a sailor to sail and try new things, could at the same time be very boring to an observer on the beach.

Next to dedicated videographer on the beach, one of the best ways to film a sailor is to attach a camera to the sail rig, point it to the sailor and have it running and taking videos throughout the windsurfing session.

There is a problem with currently available rig-attachable cameras, though, as they can see and record only half of the picture.

A sailboard is generally sailed across the wind, in either direction, called tack. On each tack, a sailor sailing the sailboard has to be on the corresponding side of the sail, such as to brace their weight against the lift force that is generated by the wind in the sail. (The sides of a windsurfer, same as other sailing vessels, are called port side and starboard side, referring to the left and right sides, respectively, of a ship as perceived by a person on board facing the bow, i.e. front.)

Mounting a single camera on one side of a sail and directing it at the sailor gives only half of the picture, as on the opposite tack the sailor will be out of view, obscured by sail. For the same reason single camera would be able to see and record only half of the sailor's transition from one tack to another.

Independently mounting two cameras, one for each side of the sail is not practical, as care has to be taken to orient cameras in relation to each other so that their fields of view are aligned. Also, independently mounted cameras might lose their alignment because of the sail rig swings inherent to sailing a windsurfer.

Using a single wide-angle camera mounted in front of the mast so as to cover both sides of the sail would not give good results, because a considerable portion of the view will be obscured by the mast, which would have to be very close to the camera's lens for the camera mount construction to be strong and rigid to withstand the forces routinely applied to windsurfing sail rigs during high speed crashes.

2. Advantages

Thus the advantages of one or more aspects are to provide a better view of a windsurfing sailor while sailing. Other advantages or one or more aspects are to provide videos of a windsurfing sailor while sailing without the help of another person, therefore being able to do it more often. These and other advantages of one or more aspects will become apparent from a consideration of the ensuing description and accompanying drawings.

SUMMARY

A multi-view video camera system for windsurfing videography, comprising: two video cameras aimed along each side of a windsurfing sail rig at corresponding locations a windsurfing sailor would occupy while sailing the windsurfing sail rig; a means for attachment of the video cameras to the windsurfing sail rig; whereby the output of the video cameras could then be combined into a composite video stream, which could then be used to analyze the technique of the windsurfing sailor.

FIGURES

REFERENCE NUMERALS

Figure 1:
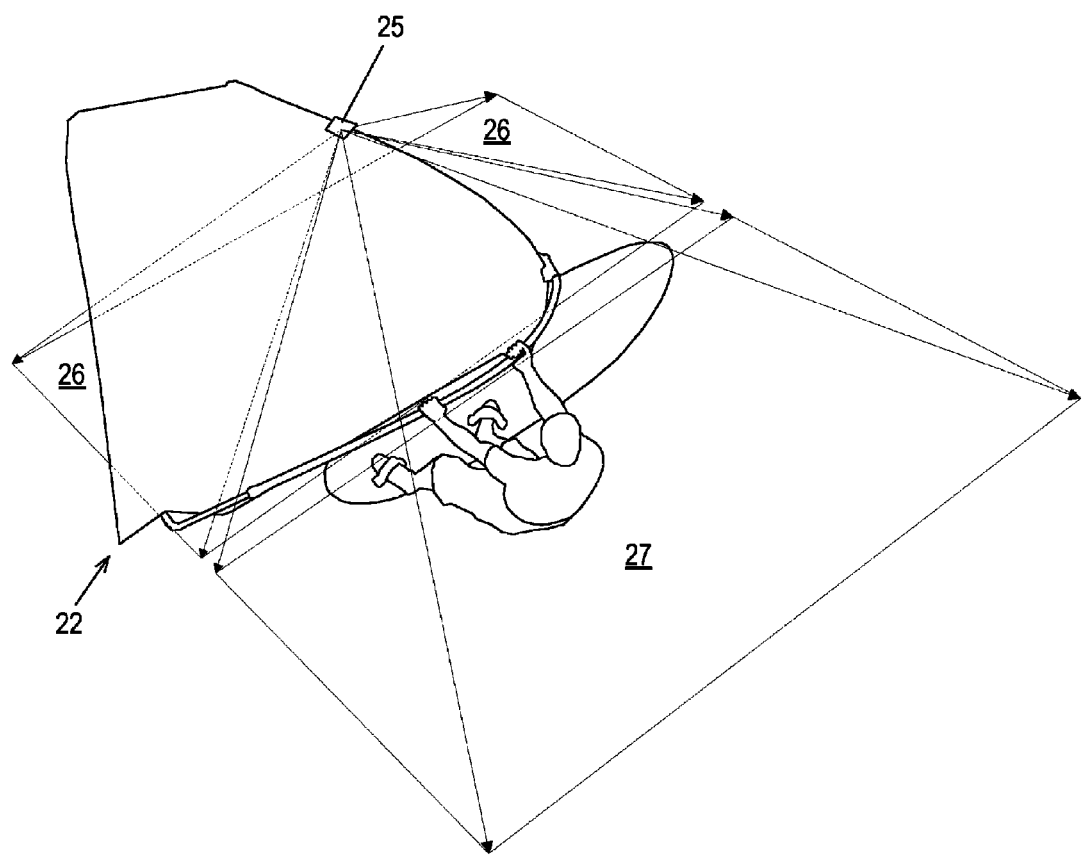
FIG. 1 shows fields of view of the multi-view video camera system in accordance with one embodiment.

7 waterproof video camera compartment
8 lens
9 machine screw for tightening the clamp
10 clamp of multi-view video camera system
11 mast inside the luff pocket of a sail
12 base of the multi-view video camera system
13 reinforcement tube for the tunnel
14 tunnel for tightening screw
15 starboard side video camera
16 port side video camera
17 angle between center lines of fields of view of port and starboard video cameras
18 center line of fields of view of port and starboard cameras, as seen in the plane of the sail 19 angle between the tangent to the mast at dual video camera attachment point and center line of field of view of port side camera
20 boom
21 tail of the boom
22 windsurfing sail rig
23 wingnut for tightening the clamp
24 digital video camera in waterproof compartment
25 multi-view video camera system
26 field of view of port side video camera
27 field of view of starboard side video camera
28 sail
29 waterproof screw-on cap
30 body of multi-view video camera system

DETAILED DESCRIPTION

Figure 3:
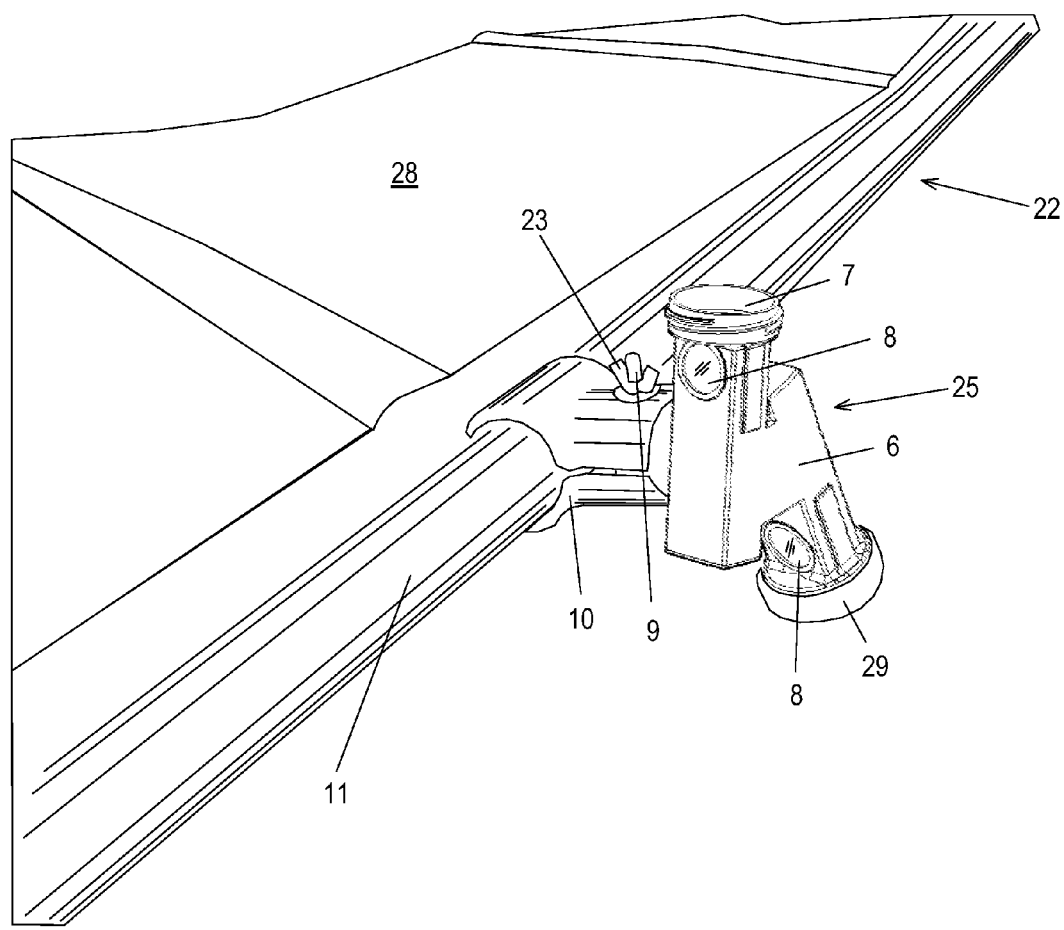
FIGS. 3 and 4 show details of multi-view video camera system construction, in accordance with one embodiment; the starboard side waterproof cap is removed for clarity on FIG. 3.
Figure 4:
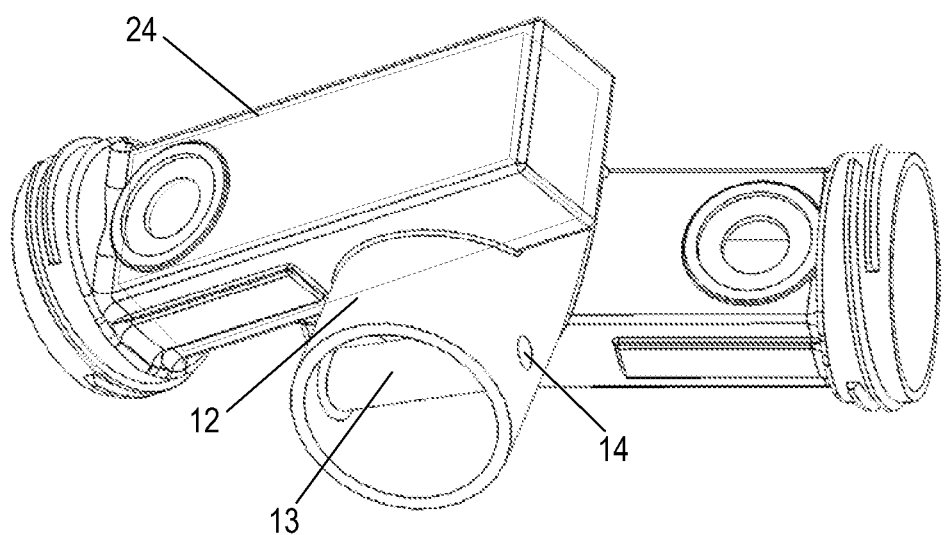

One embodiment of the multi-view video camera system 25 for windsurfing is illustrated on FIG. 3 and FIG. 4.

A typical windsurfing sail rig 22 is comprised of a sail 28, mast 11, boom 20 and a special rod with pulleys, called mast extension (not shown). The mast extension is inserted in the mast 11, the mast 11 is inserted into a luff pocket located in the leading edge of the sail 28, and the sail is then stretched on the mast using rope and pulleys in the tail of the boom 20 and in the mast extension. The windsurfing sail rig and relevant parts are illustrated on FIG. 6.

The multi-view video camera system 25 is attached to windsurfing sail rig 22 using a clamp 10, specifically to the mast 11 in the luff pocket on the leading edge of the sail. It is recommended to mount the multi-view video camera system 25 at about 1 meter from the top of the mast, to reduce swing weight, and reduce possible negative effect on the response of the tip of the mast 11 to wind gusts.

The clamp 10 is comprised of two halves, shaped to wrap around the mast 11 and base 12 of multi-view video camera system. The clamp 10 is held in place around the base 12 with a machine screw 9 and a wing nut 23. The screw 9 passes through both clamps and a tunnel 14 in the base of the body 30, illustrated on FIG. 4.

When fully closed, the clamp 10 with an internal diameter of 32 mm at the mast-wrapping end accommodates most windsurfing masts manufactured between 2004 and 2010. Other masts might require the clamp 10 to be of a different diameter.

Both the screw 9 and the wing nut 23 have fine thread to reduce the effort needed to tighten the clamp. Both the screw 9 and the wing nut 23 are made of stainless steel to minimize rust. Any other substantially rust-proof, strong and rigid material, such as brass, could be used for screw 9 and the wing nut 23 as well.

For the multi-view video camera system 1 not to fall off, the tightness of the clamp 10 set on the mast 11 should be substantial. A small degree of rotation of the multi-view video camera system 1 around the mast 11 is acceptable.

The clamp 10, both caps 29 and body 30 of multi-view video camera system 25 in this embodiment are made of Nylon-12, also known as Polyamide 12. The wall thickness of all parts is 1.5 mm. However, any strong and lightweight material could be used in corresponding thickness, as long as it does not rust or pass water.

The body 30 of the multi-view video camera system 25 in this embodiment is comprised of two elongated waterproof compartments 7 with waterproof screw-on caps 29 and lenses 8. The internal dimensions of the compartments 7 are made to accommodate, inside each compartment 7, a small digital video camera 24, such as REACOOL DVR720P digital video recorders available from Shenzhen Reacool Industry Co., Ltd. of Guangdong, China. Any other suitably small and light video camera or a custom built-in camera implementation could be used instead.

The lenses 8 are made of UV filter glass. They are attached to the body 30 with a circle of double-sided adhesive tape such as 3M VHB adhesive transfer tape 9473 from Minnesota Mining and Manufacturing of St. Paul, Minn. Any suitable lens material could be also used instead of UV filter glass and they could be attached to the body with any other suitable attachment method.

Figure 5:
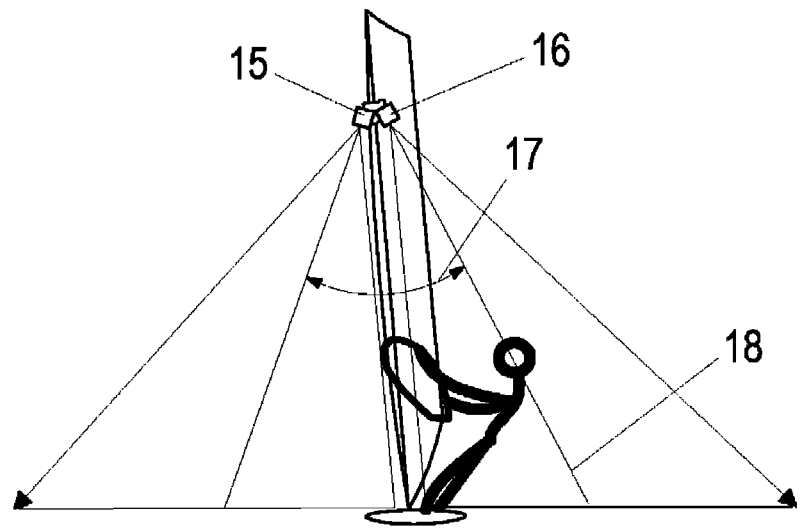
FIG. 5 illustrates angular displacement of fields of view of the multi-view video camera system in relation to each other in accordance with one embodiment.

The waterproof compartments 7 are attached to the base 12 at an angle to each other, so that fields of view of cameras 24 contained in the compartments 7 are angularly displaced in relation to each other in the plane substantially perpendicular to the plane of the windsurfing sail rig 22, as illustrated by the angle between cameras 24 on FIG. 5.

Figure 2:
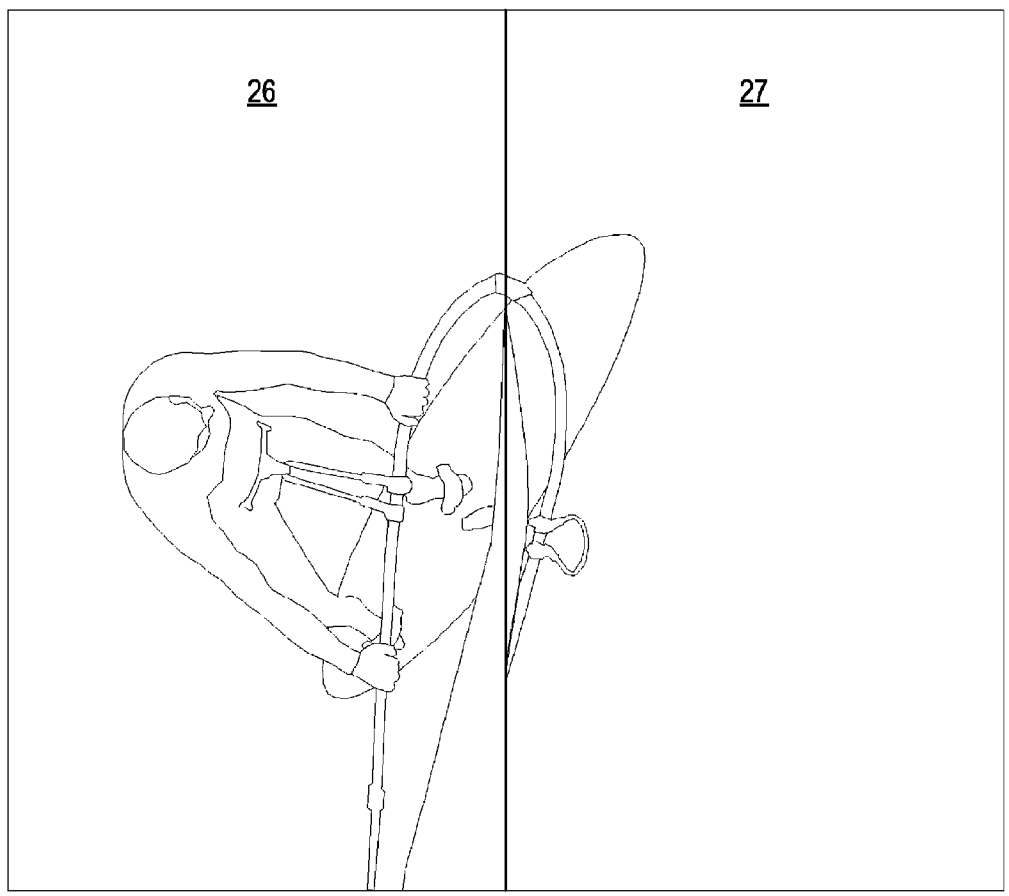
FIG. 2 shows a composite image of windsurfing board and sailor combined from views obtained with multi-view video camera system in accordance with one embodiment.
Figure 6:
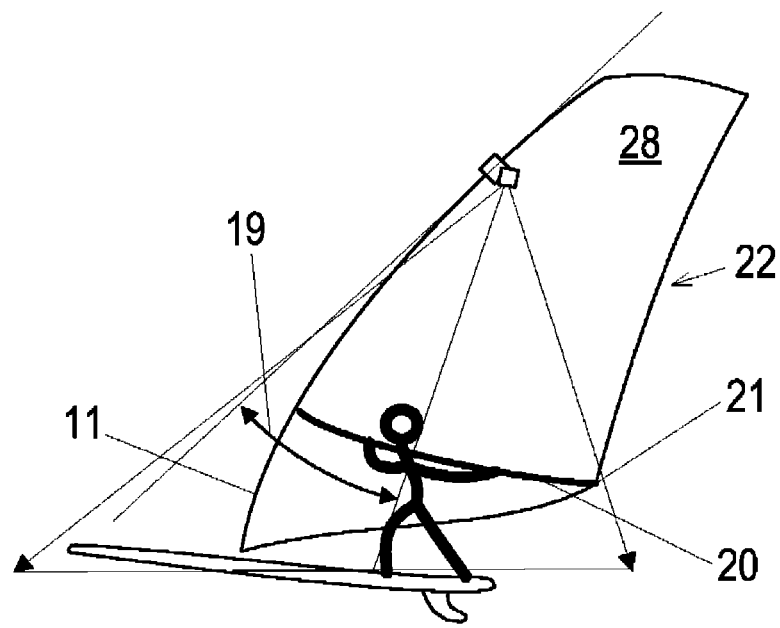
FIG. 6 illustrates angle between fields of view of the multi-view video camera system and a tangent to the mast at multi-view video camera system attachment point in accordance with one embodiment.

In addition, the compartments 7 are attached the base 12 at an angle between the tangent to the mast 11 at multi-view video camera system 25 attachment point and center line of camera's field of view in the plane of the windsurfing sail rig 18, as illustrated on FIG. 6. The angle of 22 degrees is found to be suitable for wide range of modern masts and sail sizes, but other angles might be warranted, for example by newer, older or special windsurfing sails and masts. An example of a view of a location a windsurfing sailor would typically occupy during sailing, when the camera is mounted at 22 degrees, is illustrated on FIG. 2, port side video camera view 26.

Operation

The steps below reflect the operation of this specific embodiment and may differ for other possible variations:

1. Turn on the digital video cameras 24, place them into waterproof compartments 7 of the multi-view video camera system body 25 and screw on the waterproof caps 29.
2. Attach the multi-view video camera system 25 to the mast 11 of a windsurfing sail rig 22 at about 1 meter from the top of the mast 11 as illustrated on FIG. 3.
3. Sail the windsurfing sail rig 22 on a sailboard.
4. Detach the multi-view video camera system 25 from the mast 11, unscrew the waterproof caps 29 and remove the digital video recorders.
5. Download video streams from each of the cameras 24.
6. In a video editing software application, rotate the pictures of the video streams in opposite directions 90 degrees each, scale them at the same ratio as needed and place on the video frame side by side so that the sail rig 22 is in the center of the resulting image.
7. Move the video streams on the timeline of the video editing software forward and backward to achieve suitable degree of synchronicity. Audio peaks view of the timeline could be used for that purpose.
8. Analyze the resulting video for technique or edit and compress the result for upload to a video sharing website.

Conclusion, Ramifications And Scope

Thus the reader will see that using the multi-view video camera system for windsurfing provides a better view of a windsurfing sailor during sailing, as the sailor is always in the frame and is never fully obscured by the sail. The multi-view video camera system could be used in every windsurfing session, allowing windsurfing sailor to frequently analyze and timely correct their technique, consult with coaches remotely, and, as a result, progress in the sport much faster.

While my above description contains many specificities, these should not be construed as limitations of the scope, but rather as exemplification of the embodiment thereof. Many other variations are possible. For example, a boom tail mount combined with wide-angle lenses would allow for improved view from the rear of a windsurfing sail rig, or a digital processor could be used to combine video streams during filming, or more video cameras could be added to provide improved coverage.

Accordingly, the scope should be determined not by the embodiment illustrated, but by the appended claims and their legal equivalents.

I claim:

1. A method of windsurfing videography, comprising:
   attaching two video cameras to the top portion of a windsurfing sail rig;
   aiming said cameras, one along each side of the sail of said windsurfing rig, down towards the location a windsurfing sailor would occupy while sailing on that side of the sail;
   simultaneously capturing video streams from said cameras;
   combining said video streams into a single composite video stream;
   whereby said composite video stream could then be used to analyze the technique of said windsurfing sailor sailing on either side of said windsurfing sail rig, and transitioning between the sides, minimizing the effect of said rig obscuring said sailor in said composite video stream.

2. The method of claim 1 wherein attaching of said video cameras to said windsurfing rig is done to the luff pocket and mast of the windsurfing sail rig.

3. The method of claim 1 wherein combining of said video streams further includes rotating and aligning images of the video streams.

4. The method of claim 1 wherein said video cameras are substantially waterproof.

5. An apparatus for windsurfing videography, comprising:
   two video cameras;
   a means for attachment of said video cameras to the top portion of a windsurfing sail rig, and aiming said cameras, one along each side of the sail of said windurfing sail rig, down towards the location a windsurfing sailor would occupy while sailing on that side of the sail;
   whereby the output of said video cameras could then be combined into a composite video stream, which could then be used to analyze the technique of said windsurfing sailor sailing on either side of said windsurfing sail rig, and transitioning between the sides, minimizing the effect of the rig obscuring said sailor in said composite video stream.

6. The apparatus of claim 5 wherein said means of attachment comprising a clamp that attaches to the luff pocket and mast of said windsurfing sail rig.

7. The apparatus of claim 5 wherein said video cameras are substantially waterproof.

* * * * *